(12) United States Patent
Schou (10) Patent No.: US 11,403,823 B2
(45) Date of Patent: Aug. 2, 2022

(54) TOY SYSTEM FOR ASYMMETRIC MULTIPLAYER GAME PLAY

(71) Applicant: LEGO A/S, Billund (DK)

(72) Inventor: Anders Antoft Schou, Vejle (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 16/785,111

(22) Filed: Feb. 7, 2020

(65) Prior Publication Data
US 2020/0265646 A1  Aug. 20, 2020

(30) Foreign Application Priority Data
Feb. 14, 2019  (DK) .......................... PA 2019 70101

(51) Int. Cl.
*G06T 19/00* (2011.01)
*A63F 13/92* (2014.01)
(Continued)

(52) U.S. Cl.
CPC .......... *G06T 19/006* (2013.01); *A63F 13/332* (2014.09); *A63F 13/335* (2014.09);
(Continued)

(58) Field of Classification Search
None
See application file for complete search history.

(56) References Cited

U.S. PATENT DOCUMENTS 3,005,282 A  10/1961 Christiansen
6,972,734 B1  12/2005 Ohshima et al.
(Continued)

FOREIGN PATENT DOCUMENTS

EP  2886171 A1  6/2015
WO  2014164901 A1  10/2014

OTHER PUBLICATIONS

Lee et al., "CoVAR: A Collaborative Virtual and Augmented Reality System for Remote Collaboration", ACM, 2017. (Year: 2017).*
(Continued)

*Primary Examiner* — Nicholas R Wilson
(74) *Attorney, Agent, or Firm* — Day Pitney LLP; Anthony A. Kassas (57) ABSTRACT

According to one aspect, a toy system is adapted for use in a multiplayer game, the toy system comprising a primary user device, a secondary user device, and one or more toys; wherein the primary and secondary user devices are operable in a common multiplayer game session; wherein the primary user device is configured to capture video images of a real-world scene including the one or more toys from a primary view point and to display the captured video images as a primary view of the real-world scene; wherein the secondary user device is configured to display a secondary view of a scene corresponding to the real-world scene as seen from a secondary view point; wherein the one or more toys comprise at least one user-manipulable object adapted to selectively be brought into a user-selected one of a plurality of predetermined states, at least a first one of the predetermined states having a first visual appearance; wherein the primary user device is configured to detect said first predetermined state in a primary view including the user-manipulable object, based on the first visual appearance; and wherein the secondary user device is configured to produce user-perceptible output, in response to the detected first predetermined state. Corresponding methods and computer systems for implementing the method are also provided.

29 Claims, 4 Drawing Sheets

(51) Int. Cl.
*A63F 13/48* (2014.01)
*A63F 13/335* (2014.01)
*A63F 13/332* (2014.01)
*G06V 20/20* (2022.01)

(52) U.S. Cl.
CPC .............. *A63F 13/48* (2014.09); *A63F 13/92* (2014.09); *G06V 20/20* (2022.01); *G06T 2219/024* (2013.01)

(56) References Cited

U.S. PATENT DOCUMENTS

| | | |
|---|---|---|
| 9,779,548 B2 | 10/2017 | Weisman et al. |
| 2011/0151955 A1 | 6/2011 | Nave |
| 2011/0242134 A1 | 10/2011 | Miller et al. |
| 2013/0117377 A1 | 5/2013 | Miller |
| 2014/0357366 A1 | 12/2014 | Koganezawa |
| 2014/0375688 A1 | 12/2014 | Redmann et al. |
| 2014/0378023 A1* | 12/2014 | Muthyala ............. A63H 33/042 446/91 |

OTHER PUBLICATIONS

First Technical Examination Report issued in Danish priority application No. PA 2019 70101, dated Sep. 12, 2019. (12 pp).
Wagner et al., "ARToolKitPlus for Pose Tracking on Mobile Devices", Computer Vision Winter Workshop 2007, Michael Grabner, Helmut Grabner (eds.); St. Lambreacht, Austria, Feb. 6-8, 2007. (8 pp).

* cited by examiner

TOY SYSTEM FOR ASYMMETRIC MULTIPLAYER GAME PLAY

CROSS-REFERENCE TO RELATED APPLICATIONS

This application claims the benefit of priority to Danish Patent Application No. DK PA201970101, filed on 14 Feb. 2019. The content of each of the above referenced patent applications is incorporated herein by reference in its entirety for any purpose whatsoever.

FIELD OF THE INVENTION

The invention relates to toy systems for combined multiplayer augmented and virtual reality. The toy system may be a toy construction system comprising construction elements with coupling members for detachably interconnecting construction elements.

BACKGROUND

Toy systems and, in particular, toy construction systems have been known for decades. In particular, toy construction systems comprising modular toy elements having coupling members for detachably interconnecting the modular toy elements with each other have gained high popularity. The simple building blocks have been supplemented with dedicated toy elements with a mechanical or electrical function to enhance the play value. Such functions include e.g. motors, switches and lamps.

More recently, toy systems that utilize augmented reality (AR) have attracted increased interest. Augmented reality (AR) is a technology where a captured live view of one or more items of a physical, real-world environment is augmented by computer-generated content, such as graphics, sound etc., i.e. where a user is presented with a composite representation comprising the live view of the environment and the computer-generated content, e.g. in the form of an overlay of computer-graphics onto the live view. An overlay may be additive to the natural environment or it may mask or replace the live view of the natural environment. For example, computer-generated graphics may be rendered on top of the live view or as a replacement where parts of the live view are replaced by computer-generated graphics. For the purpose of the present description, a computer-implemented system implementing AR will generally be referred to as an AR system. An AR system generally comprises an image capturing device, a suitably programmed processing unit and a display.

In an AR system, image features are often detected and recognized within the captured view of a real-world scene, and the AR system may then generate a computer-generated image (or other computer-generated content, such as sound, haptic feedback, etc.) in dependence upon the designated image feature and superimpose the generated image on the captured view (or otherwise render the computer-generated content).

It is generally desirable to engage multiple users in a game play to enhance the interactive experience and to enhance the entertainment value.

U.S. Pat. No. 9,779,548 B2 (Jordan Kent Weisman) describes a multiuser, collaborative augmented reality (AR) game system, which employs individual AR devices for viewing physical models that are recognizable to the camera and image processing module of the AR device. The system is adapted to ensure that only uniquely recognizable models are simultaneously active at a particular location. The system further permits collaborative AR to span multiple sites, by associating a portal with an anchor at each site. Using the location of their corresponding AR device as a proxy for their position, AR renditions of the other participating users are provided. A disadvantage of the system according to U.S. Pat. No. 9,779,548 B2 is that it requires all participating users to have access to an individual AR device and to a physical model.

EP 2 886 171 A1 (Microsoft) is directed to a cross-platform, multiplayer online experience that combines an augmented reality system with other platforms. For example, users of a see-through display device may participate in an AR experience. Users of a computing device operating on a different platform may participate in a cross-platform representation of the AR experience. The cross-platform representation may thereby bring the appearance of the AR experience to a user of a computing device that is typically incapable of providing such an AR experience. However, the disadvantage of such a cross-platform system is that the stimulating and engaging aspects of a playful interaction with the physical scene in an AR-enhanced physical play experience get lost in the transformation from a pure AR multiplayer experience into a hybrid system combining both AR and non-AR devices in a common multiplayer session.

It is thus desirable to provide a toy system for combined augmented and virtual reality, which facilitates or improves the interactive nature of such a hybrid environment that is adapted for the simultaneous operation of AR devices and non-AR-devices by multiple players in a common session.

Generally, it remains desirable to provide a close integration of the physical toys of the toy system and a virtual reality generated on a computer. It is further generally desirable to provide a toy system that allows small children, e.g. pre-school children, to combine physical toys, e.g. one or more physical toy construction models, with a virtual, computer-generated play experience.

It is also generally desirable to provide a toy system that is suitable for children without a detailed understanding of programming techniques, control systems, or the like.

It is also generally desirable to enhance the educational and play value of toy systems.

At least some embodiments of the toy system and other aspects disclosed herein seek to address one or more of the above problems and/or other problems arising when applying augmented-reality to toy systems in a hybrid multiplayer environment combining both augmented reality and virtual reality devices to participate and interact in a common multiplayer session.

SUMMARY

Disclosed herein are embodiments of a toy system adapted for use in a multiplayer game, the toy system comprising a primary user device, a secondary user device, and one or more toys. The primary and secondary user devices are operable in a common multiplayer game session. The primary user device is configured to capture video images of a real-world scene including the one or more toys from a primary view point and to display the captured video images as a primary view of the real-world scene. The secondary user device is configured to display a secondary view of a scene corresponding to the real-world scene as seen from a secondary view point. The one or more toys comprise at least one user-manipulable object adapted to selectively be brought into a user-selected one of a plurality of predetermined states. At least a first one of the predetermined states has a first visual appearance. The primary user device is configured to detect said first predetermined state in a primary view including the user-manipulable object, based on the first visual appearance, and the secondary user device is configured to produce user-perceptible output, in response to the detected first predetermined state.

A primary user operating the primary user device may thus control the game flow in a multiplayer session by modifying the state of the user-manipulable object, capturing and detecting the new state (or the change in state) of the user-manipulable object with the primary user device, and sharing that information in the multiplayer game session with the secondary user device, where it is used to produce user perceptible output to a secondary user operating the secondary user device. In particular, the toy system thereby provides a platform for an asymmetric multiplayer game. The platform provides an additional possibility to the primary user for controlling the multiplayer session, which requires a physical interaction with a physical toy, such as a toy model, comprising a user-manipulable object. The interaction is subsequently brought to life in a digital world, which can be shared with other players across different types of user devices. By sharing the control information with the other players and causing a user-perceptible output in response, the toy system also allows secondary players who do not have access to the model, or who do not have an AR-device at their disposal, to join the game and have part in the added functionality resulting from the recognizable user-manipulable object added to the physical toys of the system, even though they cannot control or directly detect it. It is also conceivable that the actual physical manipulation of the state of a user-manipulable object may be performed by any of the users, also by the secondary users, provided they have physical access to the one or more toys comprising a user-manipulable object. This way the secondary user could e.g. trap a primary user accidentally capturing the visual appearance of the object that has been manipulated by the secondary user. The accidental detection of such a trapping state may then be shared with the multiplayer session and cause a user-perceptible output at the secondary user device. For example, a primary user approaching a forbidden zone, which has been secured by the secondary user by setting such traps, may accidentally capture such a user-manipulable object set to a trapping state and thereby cause an alarm to be triggered at the second user device, in response to the primary user "going into the trap".

The primary user device comprises a processing unit, a user interface including a display, and an image capturing device. The primary user device is thus adapted for receiving input from a user and to provide user-perceptible output to the user. The primary user device is further configured to capture a sequence of images of a real-world scene, the scene including the at least one user-manipulable object. The primary user device may further process the captured images to detect a predetermined state within at least one of the captured images, based on a recognized visual appearance of the user-manipulable object. Detecting the predetermined state of the user-manipulable object may comprise providing a captured image as an input to a computer vision process, in particular a feature detection process or an object recognition process. Advantageously, according to some embodiments, the computer vision process is an object recognition process based on a neural network. When a predetermined state is detected, the primary user device may provide information on the detected state of the user-manipulable object to a multiplayer session in a multiplayer game environment.

The secondary user device comprises a processing unit, a user interface including a display, and optionally an image capturing device. The secondary user device is thus adapted for receiving input from a user and to provide user-perceptible output to the user. The secondary user device is further configured to receive information on a state of a user-manipulable object from a multiplayer session in a multiplayer game environment. When operated in a common multiplayer session with the primary user device, the secondary user device is thus adapted to receive information on the state of the user-manipulable object as detected by the primary user-device. Information on the current state of the user-manipulable object, or information indicating a change in the state of the user-manipulable object, may thus in a common multiplayer session be passed from the primary user device to the secondary user device. In response thereto, the secondary user device may then produce user-perceptible output.

In some embodiments, the primary user device may further be configured to generate and render computer-generated user-perceptible information prompting a primary user of the primary user device to manipulate the real-world scene by setting or changing a state of a user-manipulable object present in the scene. Said computer-generated information may include guidance of the primary user to point the capturing device towards a location of the user-manipulable object, so as to include said user-manipulable object in the primary view.

The toy system may further be configured to select and/or develop secondary instructions based on the detected state, or based on a detected change of state of the user-manipulable object. Furthermore, the toy system may be configured to execute the selected and/or developed secondary programmed instructions. Furthermore, the secondary programmed instructions may include generating user perceivable output at the secondary device, and/or game code for execution at the secondary user device.

The toy system may also include multiple primary devices and/or multiple secondary user devices, all being operable to join a common multiplayer session. A plurality of primary user devices and/or a plurality of secondary user devices may also be grouped into respective primary and secondary teams playing against each other in a multiplayer team game session.

According to some embodiments, the predetermined states further comprises a second predetermined state, the second predetermined state having a second visual appearance different from the first visual appearance. The primary user device may be configured to detect said second predetermined state in a primary view including the user-manipulable object, based on the second visual appearance. Like the first predetermined state, also the second predetermined state may be uniquely recognizable. The primary user device may further be configured to analyze the captured video images with respect to the second visual appearance of the user-manipulable object in order to detect said second predetermined state as a current state of the user-manipulable object. The primary user device may further be configured to provide information indicative of the detected second predetermined state to the at least one secondary user device, typically via the common multiplayer session. According to some embodiments, the secondary user device is configured to produce user-perceptible output, in response to the detected second predetermined state.

According to some embodiments, the user-manipulable object has in each one of the predetermined user-selectable states a respective unique visual appearance that is uniquely recognizable by the primary user device, when the user-manipulable object is within the primary view.

According to some embodiments, the primary user device is configured to detect a current state of the user-manipulable object in a primary view including the user-manipulable object, based on the visual appearance of the user-manipulable object. Furthermore, the secondary user device may be configured to produce user-perceptible output, in response to the detected current state.

According to some embodiments, the primary user device is configured to detect a change in state of the user-manipulable object in a primary view including the user-manipulable object, based on the visual appearance of the user-manipulable object. The primary user device may further be configured to analyze or monitor the captured video images with respect to changes in the visual appearance of the user-manipulable object so as to detect a change in state of the user-manipulable object. The primary user device may further be configured to provide information indicative of the detected change to the secondary processing device. A change in state may e.g. be detected by comparing the current state with a previous state of the user-manipulable object, e.g. a previously detected or otherwise initialized state stored as the previous state of the user-manipulable object in the multigame session, and determine that a change in state has occurred if a discrepancy is observed. Furthermore, the secondary processing device may be configured to produce user-perceptible output, in response to the detected change.

According to some embodiments, the primary user device is an augmented-reality (AR) device configured to display the primary view augmented with computer-generated content. Further according to some embodiments, the secondary user device is a virtual-reality (VR) device configured to display the secondary view as a computer-generated view of a virtual scene corresponding to the real world scene. In some embodiments, the secondary user device may further be configured to display the secondary view augmented with computer-generated content, in response to the detected predetermined state. The computer-generated content may be visual content, audible content, tactile content, or any combination thereof. Advantageously in some embodiments, the primary user device is one of a smartphone, a tablet computer, a game controller, and a head-mountable display. Advantageously in some embodiments, the secondary user device is one of a desktop computer, a laptop computer, a tablet computer, a smartphone, a game controller, and a head-mounted display.

According to some embodiments, at least one of the one or more toys is one of a number of pre-determined toy models and the primary user device is configured to identify said at least one toy model among the pre-determined toy models. Advantageously the secondary view at the secondary user device is provided on the basis of said identification, preferably as a virtual representation of the identified toy model. Furthermore, the at least one user-manipulable object may be placed at a pre-determined position on the toy model.

According to some embodiments, the user-manipulable object comprises a fixed portion and a moveable portion adapted to selectively be brought into a plurality of predetermined positions with respect to the fixed portion, each user-selectable position corresponding to one of the plurality of predetermined states. The moveable part may be attached/ joint to the fixed part through one of: a hinge; a swivel joint; a ball joint; a rotational bearing; a sliding bearing; a guide rail, or any other suitable moveable link. According to some embodiments, the visual appearance of the user-manipulable object includes an indicator area with a predetermined visual characteristic. The predetermined visual characteristic may be one or more of: a color; a surface texture, a pattern, textual information; a combination of alphanumeric symbols; a glyph, a one-dimensional bar code, a two-dimensional bar code; and a shape.

According to some embodiments, the toy system comprises a processing module configured to provide a multiplayer game environment for multiplayer game session processing. According to some embodiments, the primary and secondary user devices may be operable to communicate directly with each other in a common multiplayer game session. According to some embodiments, the primary and secondary user devices are operable to communicate through a further data processing system in a common multiplayer game session. The further data processing system may be a networked data processing system configured to provide networked access to a multiplayer game environment for the primary and secondary user devices. The further data processing system may be a remote and/or distributed system, such as a cloud-based data processing system. The further data processing system may be configured to host a multiplayer game session for the first and second user devices. The further data processing system may store, and execute, game code. The further data processing system may further store game related information, such as a collection with model-data on identifiable toys, e.g. for predefined toy construction models, and a collection with object-data on user-manipulable objects, each being stored with corresponding state-data on the predetermined states and the visual appearance associated with these predetermined states. The further data processing system may further store, and handle any user-related information, such as access rights, user profile data, history, assets, game stats, information regarding toys associated with a user, in particular information regarding any toy models associated with the user and adapted for use in the toy system, and the like.

According to some embodiments, multiplayer game session processing may occur at the primary device, at the secondary device, and/or at a further data processing system included in or cooperating with the toy system to provide a multiplayer game environment, the third device may be a local server or, preferably, may be a distributed/remote system, such as a cloud-based data processing system. The processing module may have stored information therein associated with the plurality of predetermined states of the user-manipulable object.

According to some embodiments, the one or more toys comprise a plurality of modular toy elements, the modular toy elements comprising cooperating coupling elements for detachably coupling the modular toy elements to each other. The one or more toys may comprise a predefined toy construction model constructed from a plurality of the modular toy elements. According to some embodiments, the primary device may be configured for identifying the toy construction model. Furthermore, the user-manipulable object may be attached to a toy construction model constructed from a plurality of toy construction elements.

Further according to some embodiments, the user-manipulable object may comprise coupling elements for detachably connecting the user-manipulable object with one or more of the modular toy construction elements. Furthermore, the user-manipulable object may be a toy construction element in itself, with a functionality allowing a user to manipulate the object for setting a pre-determined state. The user-manipulable object may also be constructed from a plurality of toy construction elements so as to build such functionality.

It may be noted that the gist of the invention described here-above in the context of the toy system may also be carried out in other ways, such as a corresponding method implemented on a suitably programmed computer system, including any of the steps explicitly described or implicitly disclosed herein. The gist of the invention may furthermore be carried out by embodiments of a toy construction set comprising one or more of the following: a computer-readable medium having stored thereon a computer program adapted to cause a computer to perform the steps of embodiments of the method explicitly described or implicitly disclosed herein, instructions for obtaining such a computer program, and/or the like.

DETAILED DESCRIPTION

Various aspects and embodiments of toy construction systems disclosed herein will now be described with reference to modular toy elements in the form of bricks. However, the invention may be applied to other forms of toy construction elements and other forms of toys.

Figure 1:
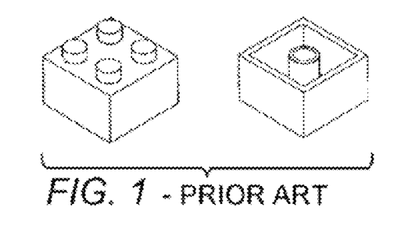
FIGS. 1-3 each show a prior art toy construction element.
Figure 2:
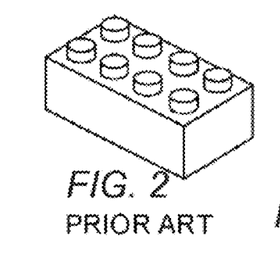
Figure 3:
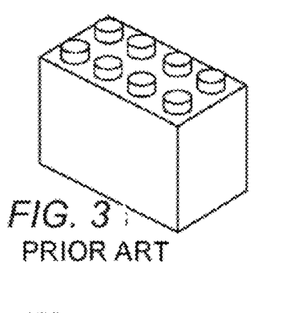

FIG. 1 shows a modular toy element with coupling pegs on its top surface and a cavity extending into the brick from the bottom. The cavity has a central tube, and coupling pegs on another brick can be received in the cavity in a frictional engagement as disclosed in U.S. Pat. No. 3,005,282. FIGS. 2 and 3 show other such prior art modular toy elements. The modular toy elements shown in the remaining figures have this known type of coupling members in the form of cooperating pegs and cavities. However, other types of coupling members may also be used in addition to or in-stead of the pegs and cavities. The coupling pegs are arranged in a square planar grid, i.e. defining orthogonal directions along which sequences of coupling pegs are arranged. The distance between neighboring coupling pegs is uniform and equal in both directions. This or similar arrangements of coupling members at coupling locations defining a regular planar grid allow the modular toy elements to be interconnected in a discrete number of positions and orientations relative to each other, in particular at right angles with respect to each other. The modular toy elements shown here, in FIGS. 1-3, are of the passive type, without additional functionality beyond mechanical model building, such as electromagnetic, electronic, optical, or the like. However, some embodiments of toy construction sets may also include active modular toy elements that are configured to perform user perceptual functions, e.g. emit light, sound, impart motion, etc.

Figure 4:
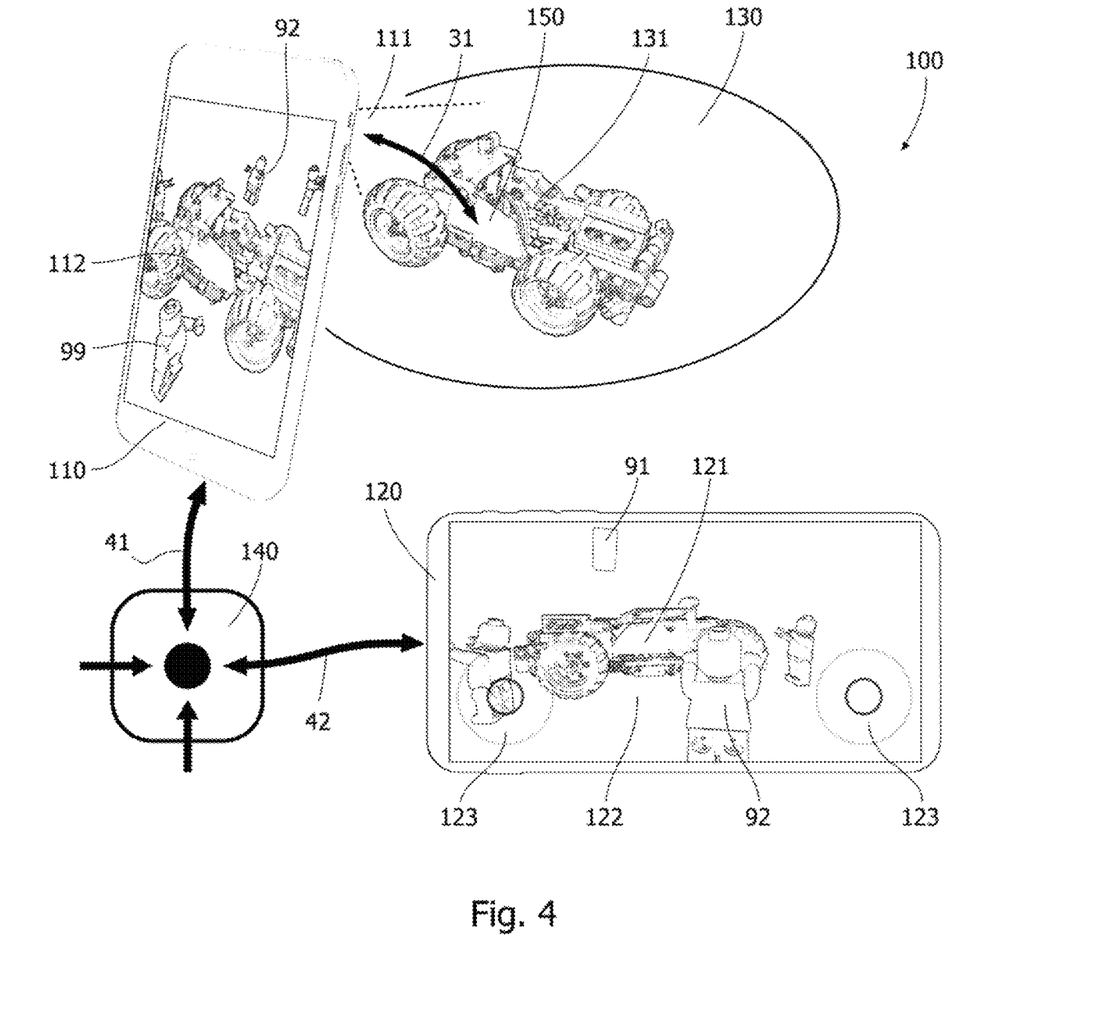
FIG. 4 shows schematically an embodiment of a toy system as disclosed herein.

FIG. 4 shows schematically an embodiment of a toy system 100 as disclosed herein. The toy system 100 is adapted for use in an augmented reality enhanced asymmetric multiplayer game. The toy system 100 comprises a primary user device 110 for use by a primary user, a secondary user device 120 for use by a secondary user, and one or more physical toys 131 placed in a real-world scene 130. The primary and secondary user devices 110, 120 are operable to join in a common multiplayer game session 140. The primary user device 110 is configured to capture video images of the real-world scene 130 including the one or more toys 131 from a primary view point 111 and to display the captured video images as a primary view 112 of the real-world scene 130. The secondary user device 120 is configured to display a secondary view 122 of a scene corresponding to the real-world scene 130 as seen from a secondary view point, which in the example of FIG. 4 is the point of view of a playable character 92 associated with the secondary user. The one or more toys 131 comprise at least one user-manipulable object 150 adapted to selectively be brought into a user-selected one of a plurality of predetermined states, i.e. at least two predetermined states 151, 152, 153, 154. In at least a first one 151 of the predetermined states 151, 152, 153, 154 the user-manipulable object 150 has a first visual appearance, whereby it is recognizable when the user-manipulable object 150 is in the first state 151. The primary user device 110 is configured to analyze the captured video images with respect to the first visual appearance of the user-manipulable object 150 so as to detect said first predetermined state 151 as a current user-selected state of the user-manipulable object 150 in a primary view 112 including the user-manipulable object 150, based on a recognition of the first visual appearance. Information indicative of the detected first predetermined state 151 may then be provided to the secondary user device 120. The secondary user device 120 may then produce user-perceptible output, in response to said information indicative of the detected first predetermined state 151.

For example, the toy system may comprise a primary tablet computer 110 having stored thereon an augmented reality (AR) App executing an AR-based digital game application. The primary tablet computer 110 may comprise a display and a digital camera. The primary tablet computer may further comprise a processing unit executing the AR App and a storage medium for storing game-related data. It will be appreciated that, instead of a tablet computer, the toy system may include another type of suitably programmed data processing device or system as the primary user device 110, including a display, a processing unit, and an image capture device. Examples of suitable primary data processing systems include a personal computer, a desktop computer, a laptop computer, a handheld computer, a game console, a handheld entertainment device, a smart phone, or any other suitably programmable computer.

The display is operatively coupled to (e.g. integrated into) the primary tablet computer 110, and operable to display, under the control of the processing unit of the primary tablet computer 110, a video image. In the example of FIG. 4, the display is a touch-sensitive display allowing the primary tablet computer to receive user inputs such that the primary user may interact with the AR-based digital game executed on the primary tablet computer 110. It will be appreciated that the data processing system may comprise alternative or additional user interface devices for allowing the primary user to interact with the digital game, e.g. by gestures, eye tracking, etc.

The digital camera is a video camera operable to capture video images of a real world scene 130. In the example of FIG. 4, the video camera is integrated into the handheld primary tablet computer 110, i.e. the primary user may move the tablet computer around so that the current field of view of the digital camera covers different parts of the real world scene 130 from different viewpoints. The real world scene 130 may e.g. include a surface such as a desktop, a floor, or the like on which a variety of objects 131 are positioned. The digital camera is operatively coupled to (e.g. integrated into) the primary tablet computer 110 and operable to forward the captured video image to the processing unit of the primary tablet computer 110.

The digital camera captures video images of the scene 130 and the primary tablet computer 110 displays the captured video images on the display. In the example of FIG. 4, the real-world scene 130 comprises the toy 131 which is shown within the field of view of the camera. In addition to the toy 131, the scene 130 may comprise further objects, such as toys, other household objects, or the like.

The captured video images are displayed by the primary tablet computer 110 on its display. Therefore, a user may move the toy 131 around and/or otherwise manipulate the toy 131 within the field of view of the digital camera and view live video images from the digital camera of the toy 131 and at least of parts of the real world scene 130. Alternatively or additionally, the primary user may change the position and/or orientation of the digital camera so as to capture images of a (e.g. stationary) toy 131 from different positions. Additionally, the computer may be operable to store the captured video images on a storage device, such as an internal or external memory, of the computer, and/or forward the captured video to another computer, e.g. via a computer network. For example, the computer may be operable to upload the captured video images to a website.

The primary tablet computer 110 is suitably programmed to execute an AR-enabled digital game, during which the computer performs image processing on the captured video images so as to detect a pre-determined state, or change in state, of a user-manipulable object 150 within the captured video image. Responsive to the detected state or change in state, the computer may be programmed to generate a modified video image, e.g. a video image formed as the captured video image having overlaid to it a computer-generated image, e.g. a video image wherein at least a part of the captured video image is replaced by a computer-generated image. The computer 110 is operable to display the modified video image on the display. For the purpose of the present description, a computer operable to implement AR functionality operatively connected to a video camera and a display will also be referred to as an AR system.

Image processing methods for detecting AR markers and for generating modified video images responsive to detected objects are known as such in the art (see e.g. Daniel Wagner and Dieter Schmalstieg, "ARToolKitPlus for Pose Tracking on Mobile Devices", Computer Vision Winter Workshop 2007, Michael Grabner, Helmut Grabner (eds.), St. Lambrecht, Austria, February 6-8, Graz Technical University).

The toy system may further comprise a secondary tablet computer 120 having stored thereon a VR App executing a VR-based digital game application. The secondary tablet computer 120 may comprise a display and a processing unit executing the VR App and a storage medium for storing game-related data. It will be appreciated that, instead of a tablet computer, the toy system may include another type of suitably programmed data processing device or system as the secondary user device 120, including a display, a processing unit, and an optional image capture device. Examples of suitable secondary data processing systems include a personal computer, a desktop computer, a laptop computer, a handheld computer, a game console, a handheld entertainment device, a smart phone, or any other suitably programmable computer.

The display is operatively coupled to (e.g. integrated into) the secondary tablet computer 120, and operable to display, under the control of the processing unit of the secondary tablet computer 120, a video image. The video image may be computer-generated, or at least include computer-generated content, on the basis of information on the real-world scene 130 captured by the primary user device 110 to form a secondary view 121 on the secondary user device 120 of a scene corresponding to said real world scene. More particular, the computer-generated content may be produced on the basis of information on the one or more toys 131 in the real world scene 130. In the example of FIG. 4, the display is a touch-sensitive display allowing the secondary tablet computer 120 to receive user inputs such that the secondary user may interact with the VR-based digital game executed on the secondary tablet computer 120. In the example of FIG. 4, the user interface comprises user input regions 123 that may be used to receive input, such as game related input from the secondary user. In particular, the user inputs 123 may be used to control a secondary point of view for producing the secondary view, thereby virtually moving around in the scene corresponding to the real world scene, and/or for performing game related interactions. It will be appreciated that the secondary data processing system may comprise alternative or additional user interface devices for allowing the secondary user to interact with the digital game, e.g. by gestures, eye tracking, etc.

The primary and secondary user devices 110, 120 also comprise communication means for linking to each other, and/or to further components forming part of the toy system, and/or even to external computing resources, such as networked computing resources, whereby the primary and secondary user devices 110, 120 are adapted to join and interact in a common multiplayer game session 140 through links 41, 42.

The secondary user device may also comprise a digital camera. It is even conceivable that the secondary user device may be an AR-enabled device, and may be operable in a similar manner as the primary device as described above. The difference is, however, that the primary user device 110 captures images of the real world scene, detects a pre-determined state or a change in state of the user-manipulable object 150 in at least one of said captured images, as indicated by arrow 31, and provides this information to the multiplayer session 140, as indicated by arrow 41. The secondary user device 120, on the other hand, receives this information on the state, or change in state, of the user-manipulable object 150 detected by the primary user device 110 from the multiplayer session 140, as indicated by arrow 42, and uses this information to produce user-perceptible output for the secondary user, in response to the detected first predetermined state 151 (or change in state).

For example, events may be presented and visualized in the secondary view on the display of the secondary user device 120, in response to an event triggered by a state, or change in state, of a user-manipulable object 150 on the physical toy 131 in the real world scene 130 as detected by the primary user using the primary user device 110. Such events visualized on the secondary user device 120 may require direct action, such as tasks to be performed by the secondary user to handle a given situation incurred by the state or change in state. A primary user may thus physically set a state 151, 152, 153, 154 of the user-manipulable object 150, detect the set state, provide the state to the multiplayer session 140 through link 41, and thereby influence the course or conditions of the game for a secondary user acting in the same multiplayer session 140 from a secondary user device 120, through link 42.

The toy system further comprises a toy 131. In the example of FIG. 4 the toy 131 is a toy construction model constructed from a plurality of modular toy elements, e.g. modular toy elements of the type described in connection with FIGS. 1-3. It will be appreciated, however, that other embodiments may employ other types of toys.

Figure 5:
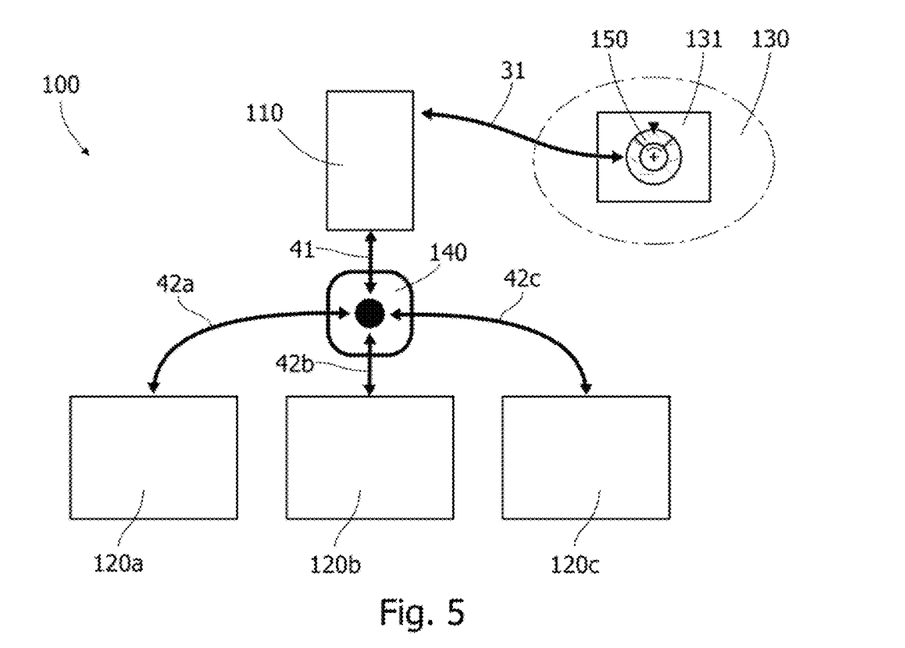
FIGS. 5-7 show schematically further embodiments of a toy system as disclosed herein.
Figure 6:
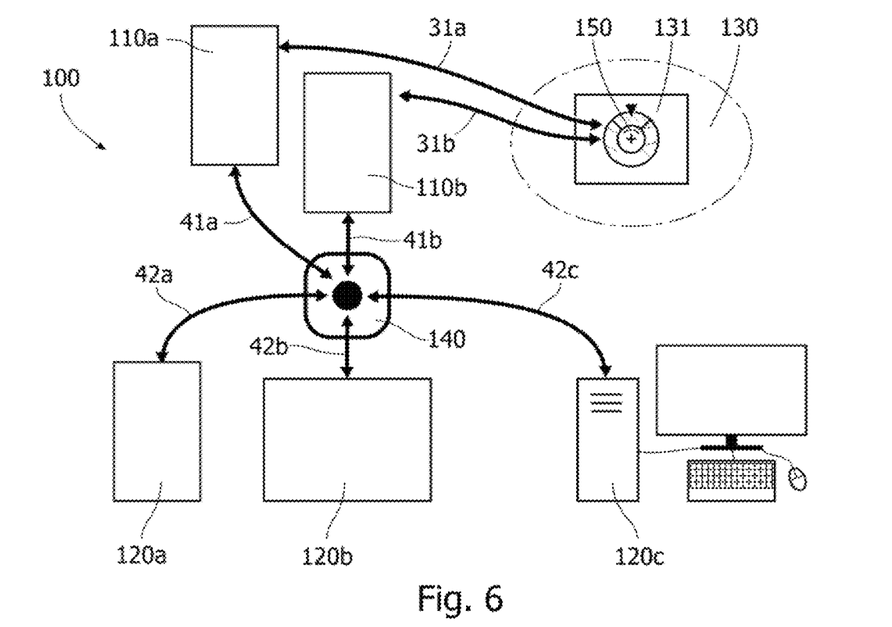
Figure 7:
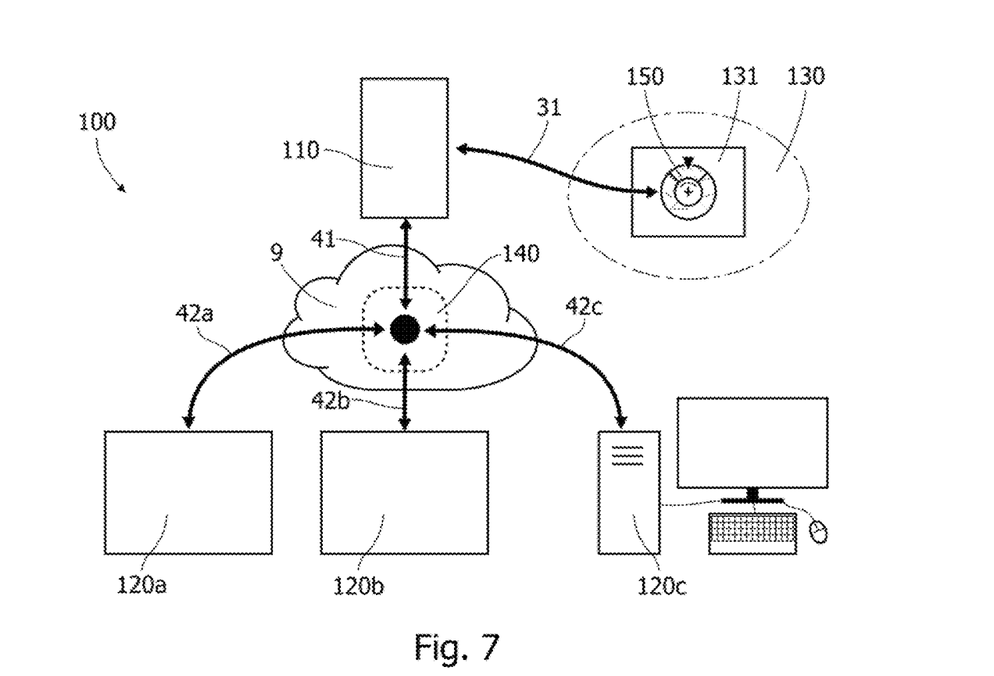

FIGS. 5-7 show schematically further embodiments of a toy system as disclosed herein. By way of a few examples, FIGS. 5-7 illustrate embodiments of the invention may be implemented in numerous different configurations to bring about an enhanced asymmetric multiplayer game experience.

In the embodiment of FIG. 5, a primary user device 110 and multiple secondary user devices 120a-c are operated to join a common multiplayer session 140 through respective links 41, and 42a-c. The primary user device 110 is located at a real world scene 130. The primary user device 110 may interact with the real-world scene 130, as indicated by arrow 31, to capture images of the real world scene 130. The real-world scene 130 includes one or more toys 131 with a user-manipulable object 150. The primary user device 110 may detect a predetermined state (or change in state) of the user-manipulable object 150. The primary user device 110 shares information on the detected state (or change in state) with the multiple secondary user devices 120a-c also present in the multiplayer session 140. The information on the detected state (or change in state) is then used to produce user-perceptible output at the secondary user devices 120a-c. As shown in FIG. 5 by way of example only, the primary user device 110 and the multiple user devices 120a-c may all be smart phones or tablet computers. Furthermore, the primary and secondary user devices 110, 120a-c may communicate directly with each other in a local network formed directly between the devices and/or through the use of a wired or wireless network infrastructure. While the primary user device 110 requires access to the real world scene 130 to capture images thereof, such local presence is not necessarily required for the secondary user devices 120a-c. Any of the secondary user-devices 120a-c may therefore also be located at a remote location with respect to the real-world scene 130. The multiplayer 140 session may be implemented as programmed instructions executed by one of the user devices 110, 120a-c participating in the multiplayer game, or by a separate data processing system (not shown) serving the participating user devices 110, 120a-c. The multiplayer 140 session may also be implemented as programmed instructions executed in a distributed manner by a combination of any of the user devices 110, 120a-c participating in the multiplayer game, and/or a separate data processing system.

In the embodiment of FIG. 6, multiple primary user devices 110a-b and multiple secondary user devices 120a-c are operated to join a common multiplayer session 140 through respective links 41a-b, 42a-c. The primary user devices 110a-b are all located at a real world scene 130. The primary user devices 110a-b may interact with the real-world scene 130, as indicated by arrows 31a-b, to capture images of the real world scene 130. The real-world scene 130 includes one or more toys 131 with a user-manipulable object 150. One or more of the primary user devices 110a-b may detect a predetermined state (or change in state) of the user-manipulable object 150. The relevant primary user device 110a-b shares the information on the detected state (or change in state) with the multiple secondary user devices 120a-c also present in the multiplayer session 140. The information on the detected state (or change in state) is then used to produce user-perceptible output at the secondary user devices 120a-c. As shown in FIG. 6 by way of example only, the primary user devices 110a-b and the multiple user devices 120a-c may include smart phones, tablet computers, and conventional laptop or desktop computers. Furthermore, the primary and secondary user devices 110a-b, 120a-c may communicate directly with each other in a local network formed directly between the devices and/or through the use of a wired or wireless network infrastructure. While the primary user devices 110a-b require access to the real world scene 130 to capture images thereof, such local presence is not necessarily required for the secondary user devices 120a-c. Any of the secondary user-devices 120a-c may therefore also be located at a remote location with respect to the real-world scene 130. The multiplayer 140 session may be implemented as programmed instructions executed by one of the user devices 110a-b, 120a-c participating in the multiplayer game, or by a separate data processing system (not shown) serving the participating user devices 110a-b, 120a-c. The multiplayer 140 session may also be implemented as programmed instructions executed in a distributed manner by a combination of any of the user devices 110a-b, 120a-c participating in the multiplayer game, and/or a separate data processing system.

In the embodiment of FIG. 7, a primary user device 110 and multiple secondary user devices 120a-c are operated to join a common multiplayer session 140 through respective links 41, 42a-c. The primary user device 110 is located at a real world scene 130. The primary user device 110 may interact with a real-world scene 130, as indicated by arrow 31, to capture images of the real world scene 130. The real-world scene 130 includes one or more toys 131 with a user-manipulable object 150. The primary user device 110 may detect a predetermined state (or change in state) of the user-manipulable object 150. The primary user device 110 shares information on the detected state (or change in state) with the multiple secondary user devices 120a-c also present in the multiplayer session 140. The information on the detected state (or change in state) is then used to produce user-perceptible output at the secondary user devices 120a-c. As shown in FIG. 7 by way of example only, the primary user device 110 and the multiple user devices 120a-c may include smart phones, tablet computers, and conventional laptop or desktop computers. In the example shown in FIG. 7, the primary and secondary user devices 110, 120a-c communicate with each other through a networked infrastructure. While the primary user device 110 requires access to the real world scene 130 to capture images thereof, such local presence is not necessarily required for the secondary user devices 120a-c. Any of the secondary user-devices 120a-c may therefore also be located at a remote location with respect to the real-world scene 130. Furthermore in the example shown in FIG. 7, the multiplayer 140 session may be implemented as programmed instructions executed by a cloud processing system 9 serving the participating user devices 110a, 120a-c. The multiplayer 140 session may also be implemented as programmed instructions executed in a distributed manner by a combination of such cloud computing resources 9 and any of the user devices 110a-b, 120a-c participating in the multiplayer game, and separate local data processing systems (not shown).

Figure 8A:
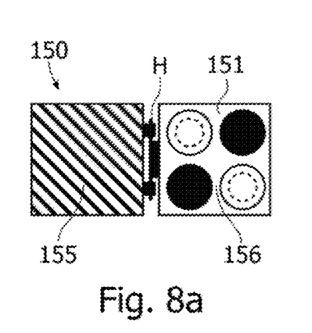
FIGS. 8a/b-10a/b show different examples of user-manipulable objects in two different states, respectively.

FIGS. 8*a/b*, 9*a/b*, and 10*a/b*, show different examples of user manipulable objects 150 with various states. The user-manipulable objects 150 are each shown in two different pre-determined states, wherein at least a first pre-determined state 151 is detectable by a primary user device 110 as discussed elsewhere herein. In the examples shown in FIGS. 8*a/b*, 9*a/b*, and 10*a/b*, the different states of the user-manipulable object are realized by different mechanical functions.

The user-manipulable objects shown in FIGS. 8*a/b*, 9*a/b*, and 10*a/b* comprise a moveable portion 155 and a fixed portion 156. The moveable portion 155 is adapted to selectively be brought into a plurality of predetermined positions with respect to the fixed portion 156, wherein each user-selectable position corresponds to one of the plurality of predetermined states. In FIGS. 8*a/b*, 9*a/b*, and 10*a/b* two different states are illustrated for each of the user-manipulable objects 150.

The user-manipulable object 150 shown in FIG. 8*a/b* has a moveable portion 155, which is attached to a fixed portion 156 by means of a hinge H allowing the moveable portion 155 to be folded over the fixed portion 156. As seen in FIG. 8*a*, the fixed portion 156 carries a two-dimensional code on an indicator area thereof. The two-dimensional code may be recognizable in the primary user device 110, e.g. by a computer vision process executed on the primary user device 110. The two-dimensional code characterizes the visual appearance of a first state 151 of the user-manipulable object 150 as seen in FIG. 8*a*. The first state 151 may thus be detected when the primary user device recognizes the two-dimensional code. In a second state shown in FIG. 8*b*, the moveable portion 155 is folded over the fixed portion 156, thereby closing the user-manipulable object like a clam-shell to conceal the two-dimensional code. In some embodiments of the toy system, the closed state of FIG. 8*b* may not be detectable by the primary device 110. The user-manipulable object shown in FIG. 8*a/b* is thus particular useful e.g. for activating an event or behavior in the multiplayer game, when the moveable portion 155 is brought into the OPEN position with respect to the fixed portion 156, such that the recognizable two-dimensional code on the indicator area can be detected.

Figure 9A:
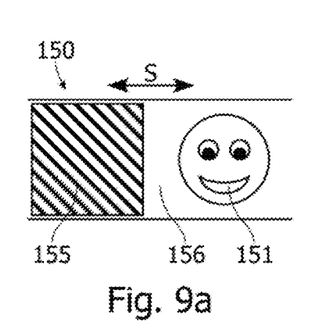
Figure 9B:
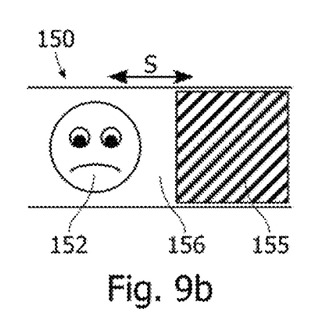

The user-manipulable object 150 shown in FIG. 9*a/b* has a moveable portion 155, which is attached to a fixed portion 156 by means of a sliding joint S allowing the moveable portion 155 to slide over the fixed portion 156 into different positions, in the present example two different positions shown in FIG. 9*a* and FIG. 9*b*, respectively. The fixed portion carries two different symbols, which each may be recognized, and distinguished from one another, by a primary user device 110. When the moveable portion 155 is in the left position, as seen in FIG. 9*a*, a happy smiley indicative of a recognizable first predetermined state 151 is seen. When the moveable portion 155 is in the right position, as seen in FIG. 9*b*, a sad smiley indicative of a recognizable second predetermined state 152 is seen. The user-manipulable object 150 of FIG. 9*a/b* is thus useful e.g. as a control for switching between two distinguishable game related events or behaviors.

Figure 10A:
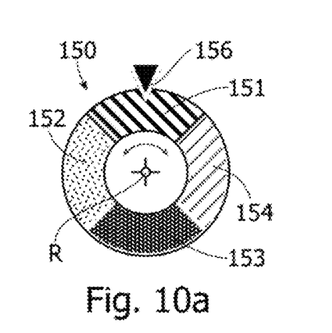
Figure 10B:
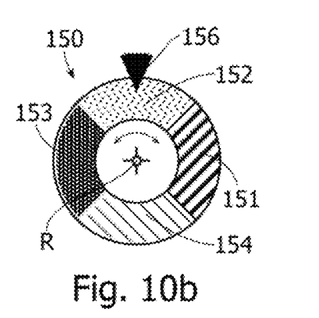

The user-manipulable object 150 shown in FIG. 10*a/b* has a moveable portion 155, which is attached to a fixed portion 156 by means of a rotatable joint R allowing the moveable portion 155 to be rotated with respect to the fixed portion 156 into different positions. The rotatable wheel 155 may have a plurality of indicator areas that can be recognized, and distinguished, by primary user device 110. At least adjacent indicator areas should be marked in a different manner so as to be able to distinguish neighboring indicator areas from each other. The rotatable wheel 155 of FIG. 10*a/b* has four indicator areas, each marked with a different color as illustrated by different hatchings. A given predetermined state may be recognized when the rotatable wheel 155 is positioned such that a specific one of the indicator fields is aligned with the solid marker of the fixed portion 156. Thereby, four different distinguishable states 151, 152, 153, 154 can be realized, and detected by means of primary user device 110. The user-manipulable object 150 of FIG. 9*a/b* is thus useful e.g. as a control for switching between a plurality of distinguishable game related events or behaviors by means of a simple rotation. The rotation may be performed by a user in a controlled manner to purposively set a specific state 151, 152, 153, 154. However, it is also conceivable that a user may spin the rotatable portion 155 in a more randomized manner to allow for an aspect of chance in the outcome of the predetermined state 151, 152, 153, 154 set by the physical interaction with the user-manipulable object 150.

Setting or changing a state of a user-manipulable object may thus include e.g. one or more of the following: moving an element of the user-manipulable object, re-positioning an element of the user-manipulable object, changing the orientation of an element of the user-manipulable object. Moving, re-positioning, or rotating an element may entail revealing or concealing an indicator element carrying a visual characteristic, which is recognizable by the primary user device. According to some embodiments, it is also conceivable that such moving, re-positioning, or rotating of an element may cause a change in the overall shape of the user-manipulable object. It may also cause a change in the orientation or in the exact positioning of elements of the user-manipulable object with respect to remaining elements of the user-manipulable object, or with respect to a toy to which it is attached. The resulting shape, position and/or orientation may also be recognizable by the primary user device. The result of the recognition of the visual appearance of the user-manipulable object may then be used for detecting a predetermined state of the user-manipulable object. Alternatively or in addition thereto a change in the recognizable visual appearance may be recognized and registered as a change in the state of the user-manipulable object.

Figure 8B:
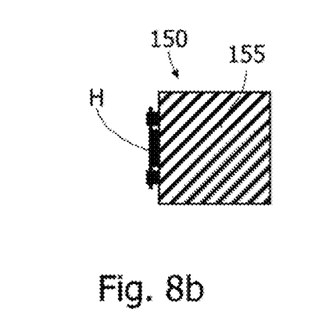

While in FIG. 8*a/b* emphasis is put on mechanical functionality to provide a user-manipulable object with different predetermined states, it is also conceivable to provide a user-manipulable object with a plurality of visually distinguishable predetermined states by any other suitable means. For example, a visual appearance that may be recognized in images captured by a primary user device may also be realized by means of electrically, electronically, or digitally controlled indicator means, such as one or more light emitters or a display.

Figure 11:
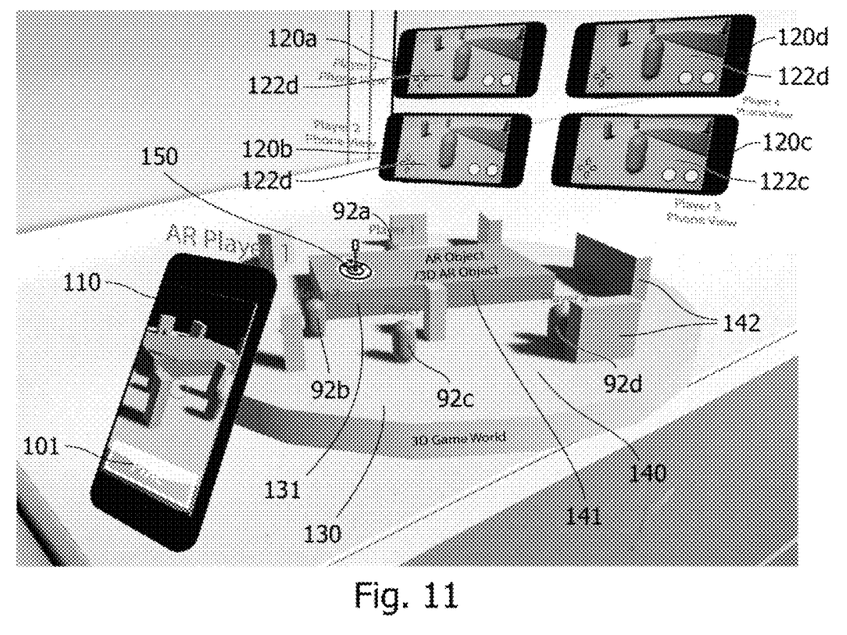
FIG. 11 shows an example of an asymmetric multiplayer digital game experience.
Figure 12:
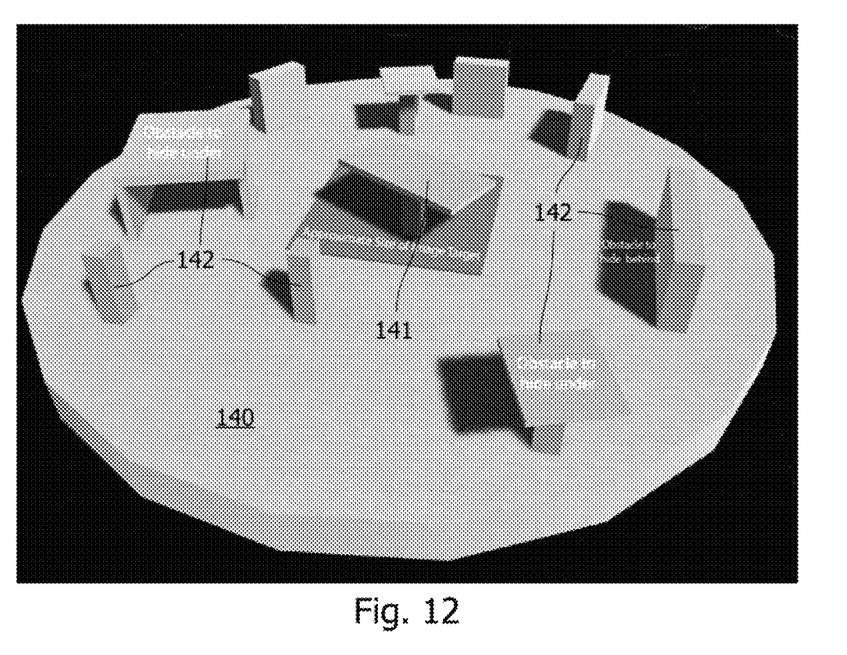
FIG. 12 illustrates an example of a game world including various obstacles allowing a player to hide.

Turning now to FIGS. 11 and 12, an example of an asymmetric digital game experience with one AR-enabled primary device (AR Player 1) and four VR-enabled devices (Player 1-4) meeting in a common multiplayer session in a 3D game world is briefly described.

FIG. 11 shows schematically a primary user device 110 capturing a real world scene 130 comprising a toy model 131 of e.g. a building, and a user-manipulable object 150. The real-world scene may be set on a table in a room where a primary user operating the primary user device 110 may be located. The primary user device may be operated to join a multiplayer session 140, here represented by a three-dimensional game world defining a virtual scene corresponding to the real world scene. The primary user device may show a primary view of the real world scene 130 augmented with computer-generated content to provide an AR-experience. The primary view is shown as seen from a primary view point, which may be controlled e.g. by moving the primary user device 110 with respect to the real world scene 130, wherein the computer-generated AR-content is tracked and presented on a display screen of the primary user device 110 accordingly. In addition to a computer-generated virtual representation 141 of the toy model 131, the multiplayer session 140 comprises further computer-generated virtual objects 142 that may be thematically linked to the toy model 131 and its virtual representation 141. For example, if the toy model 131 is a pirate ship, the virtual scene 140 may be set on a deserted island surrounded by dangerous reefs, and the additional virtual objects 142 may include palm trees, primitive huts, and a treasure cave. Furthermore, FIG. 11 shows secondary user devices 120a-d, which may or may not be at the same location as the real world scene and the primary user device. The secondary user devices 120a-d may be operated to join the same multiplayer session 140 as the primary user device 110. The secondary user devices 120a-d may access the multiplayer session 140 through a local or remote link depending on the location and the actual implementation of the multiplayer session 140 as discussed elsewhere herein. The secondary user devices 120a-d can then on a display thereof show a respective secondary view 122a-d of the virtual three-dimensional game world including the virtual representation 141 of the toy model 131 and any of the additional virtual objects 142, according to the respective secondary view point of the secondary user device 120a-d. The secondary view point may be the point of view of a playable character associated with a given secondary user device 120a-d. The playable character may be controlled by the secondary user using input controls 123, which may be touch sensitive input areas on a graphical user interface of the secondary user device 120a-d, e.g. configured with buttons and/or a joy-stick control functionality.

In the above-mentioned pirate setting, the primary player (or a team of primary players not shown here) may play treasure hunter (or a group of treasure hunters), and the secondary players may be left-behind pirates trying to defend the treasure. User-manipulable objects may then be manipulated to modify the flow of the game e.g. changing the weather by a random spin of a color wheel, releasing wild animals, or for conjuring spirits of cursed pirates.

In another example, the toy model 131 may be a model of a haunted house fairground attraction, which then may be set in a virtual fairground scene equipped with additional objects 142, such as further fairground attractions like a merry-go-rounds, a roller coaster, a fortune teller's tent, or an ice cream and popcorn sales cart. The fairground may be haunted by ghosts played by secondary users using secondary user devices 120a-d. The ghosts may move around haunting different attractions as controlled by means of the user inputs 123 on the secondary user devices 120a-d. The ghosts may be of different kinds, each kind being associated with a pre-determined color. A primary user (or a team of primary players not shown here), may have the task to hunt the ghosts, but may only be able to see the ghosts of one color at a time, according to a current color setting. The current color setting may be determined by means of a user-manipulable object 150, such as the above-mentioned color wheel, which may be controlled by the primary user. Moving around the ghosts may also hide behind or under objects 141, 142 in the virtual scene 140. When a ghost comes into sight, the ghost hunter may catch or eliminate the ghost by aiming with the AR-enabled primary user device at the virtual representation of the secondary player 92a-d, here a ghost of a given color, and pressing at the FIRE button. Generally, the real world scene may also comprise a plurality of user-manipulable objects distributed through the scene and with different functionalities and effect on the game. For example, a user-manipulable object (not shown) may have a hatch concealing a symbol or code characterizing a detectable state. By opening the hatch and detecting the revealed symbol or code with the primary user device 110, a side-kick helping the ghost hunter to seek the hidden ghosts may be activated. At the secondary device a change in the current color setting may be indicated by a change in color of an element of the avatar of the primary player, and may also activate portals for the ghosts of the current color to escape into another color. In a similar manner, activating the side kick may result in a visual, audible, tactile, and/or other user-perceptible output to be produced on the secondary devices indicating the detected state (or change in state) and/or modifying thereby the flow of the multiplayer game session.

Very briefly, FIG. 12 merely illustrates an example of a game world including various obstacles allowing a secondary player to hide from a primary player in e.g. a hide-and-seek type of game, such as the above-mentioned specific implementation of a hide-and-seek concept in a hunter's game. The obstacles may include any of the computer-generated objects 141, 142 in the virtual scene 140.

As mentioned above, the different aspects of the present invention can be implemented in different ways including the toy system described in respect of the various embodiments of the aspects described above and in the following. Further aspects of the present invention can e.g. be implemented as corresponding methods, apparatus, and products. Each aspect, yields one or more of the benefits and advantages described in connection with at least one of the aspects described above, and each aspect having one or more preferred embodiments corresponding to the preferred embodiments described in connection with at least one of the aspects described above and in the following and/or disclosed in the dependant claims. Furthermore, it will be appreciated that embodiments described in connection with one of the aspects described herein may equally be applied to the other aspects.

In particular, a computer-implemented method is provided for generating an asymmetric multiplayer play experience, the process comprising:

capturing a sequence of images of a real world scene using a primary user device, the real-world scene including at least one toy with a user-manipulable object;

operating the primary user device and at least one secondary user device to join in a common multiplayer digital game session;

in the multiplayer game session, providing a virtual representation corresponding to the real world scene;

processing the captured images to detect at least a first predetermined state of the user-manipulable object within the real-world scene;

providing information on the first predetermined state to the multiplayer session;

responsive to the information on the detected predetermined state, generating and rendering computer-generated user-perceptible output associated with the detected predetermined state at the at least one secondary user device.

Furthermore, a data processing system is provided that is configured, e.g. by suitable program code stored on the data processing system, to perform the steps of one or more of the computer-implemented methods explicitly described or implicitly disclosed herein.

Yet further, a computer program product is provided comprising program code adapted to cause, when executed on a data processing system, a data processing system to perform the steps of one or more of the computer-implemented methods explicitly described or implicitly disclosed herein.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, an App, or the like, e.g. on a web server for download over the internet or other computer or communication network. In particular, an embodiment of a toy construction set may include toy construction elements, and installation instructions for installing a computer program product on a suitable data processing system.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A toy system configured for use in an asymmetric multiplayer game, the toy system comprising a primary user device, a secondary user device, and one or more toys;
   wherein the primary and secondary user devices are operable in an asymmetric multiplayer game session;
   wherein the primary user device is configured to capture video images of a real-world scene including the one or more toys from a primary view point and to display the captured video images as a primary view of the real-world scene
   wherein the secondary user device is configured to display a secondary view of a scene corresponding to the real-world scene as seen from a secondary view point;
   wherein the one or more toys comprise at least one user-manipulable object configured to selectively be brought into a user-selected plurality of predetermined states, a first user-selected predetermined state of the user-selected one of a plurality of predetermined states having a first visual appearance;
   wherein the primary user device is configured to detect the first user-selected predetermined state of the user-selected plurality of predetermined states in a primary view including the user-manipulable object, based on the first visual appearance;
   wherein the secondary user device is configured to produce user-perceptible output, in response to the first user-selected predetermined state of the user-selected plurality of predetermined states; and
   wherein the primary user device is operable to control and influence a game flow in the asymmetric multiplayer game session by:
      modifying the first user-selected predetermined state of the user-selected plurality of predetermined states of the user-manipulable object within the asymmetric multiplayer game session,
      capturing and detecting a change in the user-selected plurality of predetermined states within the asymmetric multiplayer game session, and
      sharing the change in the asymmetric multiplayer game session with the secondary device, the secondary user device configured to receive information indicative of the user-selected plurality of predetermined states of the user-manipulable object.

2. A toy system according to claim 1, wherein the user-selected plurality of predetermined states further comprises a second user-selected predetermined state of the user-selected plurality of predetermined states having a second visual appearance different from the first user-selected one of a plurality of predetermined state visual appearance.

3. A toy system according to claim 2, wherein the primary user device is configured to detect the second user-selected predetermined state of the user-selected plurality of predetermined states in a primary view including the user-manipulable object based on the second visual appearance.

4. A toy system according to claim 3, wherein the secondary user device is configured to produce user-perceptible output in response to detecting the second user-selected plurality of predetermined states.

5. A toy system according to claim 1, wherein the user-manipulable object in each one of the user-selected plurality of predetermined states has a respective unique visual appearance that is uniquely recognizable by the primary user device when the user-manipulable object is within the primary view.

6. A toy system according to claim 1, wherein the primary user device is configured to detect a current state of the user-manipulable object in a primary view including the user-manipulable object based on the first visual appearance of the user-manipulable object.

7. A toy system according to claim 6, wherein the secondary user device is configured to produce user-perceptible output in response to the detected current state.

8. A toy system according to claim 1, wherein the primary user device is configured to detect a change in state of the user-manipulable object in a primary view including the user-manipulable object based on the visual appearance of the user-manipulable object.

9. A toy system according to claim 8, wherein the secondary processing device is configured to produce user-perceptible output in response to the detected change.

10. A toy system according to claim 1, wherein the primary user device is an augmented-reality (AR) device configured to display the primary view augmented with computer-generated content.

11. A toy system according to claim 10, wherein the computer-generated content is one of visual content, audible content, tactile content, and any combination thereof.

12. A toy system according to claim 1, wherein the primary user device is one of a smartphone, a tablet computer, a game controller, and a head-mounted display.

13. A toy system according to claim 1, wherein the secondary user device is a virtual-reality (VR) device configured to display the secondary view as a computer-generated view of a virtual scene corresponding to the real world scene.

14. A toy system according to claim 13, wherein the secondary user device is configured to display the secondary view augmented with computer-generated content in response to detecting the first user-selected predetermined state of the user-selected plurality of predetermined states.

15. A toy system according to claim 14, wherein the computer-generated content is one of visual content, audible content, tactile content, and any combination thereof.

16. A toy system according to claim 1, wherein the secondary user device is one of a desktop computer, a laptop computer, a tablet computer, a smartphone, a game controller, and a head-mounted display.

17. A toy system according to claim 1, wherein at least one of the one or more toys is one of a number of pre-determined toy models and wherein the primary user device is configured to identify the toy model.

18. A toy system according to claim 17, wherein the at least one user-manipulable object is placed at a pre-determined position on the toy model.

19. A toy system according to claim 1, wherein the user-manipulable object comprises a fixed portion and a moveable portion configured to selectively be brought into a plurality of predetermined positions with respect to the fixed portion, each user-selectable position corresponding to one of the user-selected plurality of predetermined states.

20. A toy system according to claim 19, wherein the moveable part is attached/joined to the fixed part through one of: a hinge; a swivel joint; a ball joint; a rotational bearing; a sliding bearing; and a guide rail.

21. A toy system according to claim 1, wherein the first visual appearance includes an indicator area with a predetermined visual characteristic.

22. A toy system according to claim 21, wherein the predetermined visual characteristic is one or more of: a color; a surface texture, a pattern, textual information; a combination of alphanumeric symbols; a glyph, a one-dimensional bar code, a two-dimensional bar code; and a shape.

23. A toy system according to claim 1, wherein the toy system further comprises a processing module configured to provide a multiplayer game environment for the asymmetric multiplayer game session processing.

24. A toy system according to claim 1, wherein the primary and secondary user devices are operable to communicate directly with each other in the asymmetric multiplayer game session.

25. A toy system according to claim 1, wherein the primary and secondary user devices are operable to communicate through a further data processing system in the asymmetric multiplayer game session.

26. A toy system according to claim 1, wherein further data processing system is a networked data processing system configured to provide networked access to a multiplayer game environment for the primary and secondary user devices.

27. A toy system according to claim 1, wherein the one or more toys comprise a plurality of modular toy elements having cooperating coupling elements for detachably coupling the modular toy elements to each other.

28. A toy system according to claim 27, wherein the one or more toys comprise a predefined toy construction model constructed from the plurality of the modular toy elements.

29. A toy system according to claim 27, wherein the user-manipulable object comprises coupling elements for detachably connecting the user-manipulable object with one or more of the modular toy construction elements.

* * * * *